United States Patent [19]

Tillis et al.

[11] Patent Number: 4,971,709
[45] Date of Patent: Nov. 20, 1990

[54] METHOD AND COMPOSITION FOR INHIBITING CORROSION OF FERROUS METALS BY AQUEOUS BRINES

[75] Inventors: William J. Tillis, Houston; John J. Augsburger, Bellaire, both of Tex.

[73] Assignee: Baroid Technology, Inc., Houston, Tex.

[21] Appl. No.: 306,538

[22] Filed: Feb. 3, 1989

[51] Int. Cl.$^5$ .......................... C23F 11/00; C09K 7/00
[52] U.S. Cl. ................................. 252/8.555; 252/8.51; 252/8.551; 252/146; 252/387; 106/1.17; 106/14.33
[58] Field of Search ................. 252/8.51, 8.551, 8.555, 252/146, 387; 106/1.17, 14.33

[56] References Cited

U.S. PATENT DOCUMENTS

| | | | |
|---|---|---|---|
| 2,635,996 | 4/1953 | Rohrback et al. | 252/8.555 |
| 2,635,997 | 4/1953 | Rohrback et al. | 252/8.555 |
| 2,635,998 | 4/1953 | Rohrback et al. | 252/8.555 |
| 2,635,999 | 4/1953 | Rohrback et al. | 252/8.555 |
| 2,636,000 | 4/1953 | Rohrback et al. | 252/8.555 |
| 3,562,124 | 2/1971 | Leon et al. | 106/14.33 X |
| 4,289,631 | 9/1981 | Luxemburg | 252/8.551 |

FOREIGN PATENT DOCUMENTS 829884  5/1981  U.S.S.R. .

OTHER PUBLICATIONS

Hudgins et al., *The Oil and Gas Journal*, Jul. 24, 1961, pp. 91–96.

*Primary Examiner*—Robert L. Stoll
*Assistant Examiner*—Chhaya Sayala
*Attorney, Agent, or Firm*—Browning, Bushman, Anderson & Brookhart

[57] ABSTRACT

A method of inhibiting corrosion of ferrous metals by zinc-containing brines by mixing with the brine a particulate metal additive, the metal of the additive having a standard oxidation-reduction potential above 0.5 and below 2.5 volts, the metal additive being present in an amount sufficient to inhibit corrosion of the ferrous metals contacted by the brine.

12 Claims, No Drawings

METHOD AND COMPOSITION FOR INHIBITING CORROSION OF FERROUS METALS BY AQUEOUS BRINES

BACKGROUND OF THE INVENTION

1. Field of the Invention

The present invention relates to corrosion inhibition and, more particularly, to inhibiting corrosion of ferrous metals by aqueous brines such as are commonly used in the petroleum industry.

2. Description of the Background

Aqueous brines are commonly used in well servicing fluids, such as drilling fluids, workover fluids, completion fluids, packer fluids, well treating fluids, subterranean formation treating fluids, spacer fluids, hole abandonment fluids, etc. In particular, zinc bromide, calcium bromide and calcium chloride brines and mixtures of these are particularly useful because they are solids free and have high specific gravities.

A relatively severe problem in the use of aqueous brines in well treating applications is the fact that the brines are corrosive to the tubing, casing and other ferrous metal components in and around the well bore. The corrosiveness is especially significant at temperatures above about 250° F., a temperature which is frequently encountered in well bores.

It is known to utilize amines, imidazolines, chromates, phosphates, etc. as corrosion inhibitors in aqueous brines, such inhibitors generally acting to form films on the surface of the ferrous metal components. Likewise, thioureas, thiocyanates, etc. can also be employed to form ferrous sulfide films on the ferrous metal components.

It is also known that certain metals, in conjunction with known corrosion inhibitors, will act to reduce corrosion of ferrous metal in certain media. For example, Russian Patent No. 829884 teaches the incorporation of metallic zinc in a well treating solution which contains hydrochloric acid, the zinc reacting with the HCl to form hydrogen which reduces $FeCl_3$ to $FeCl_2$, which in turn does not adversely affect the corrosion inhibitors. U.S. Pat. Nos. 2,635,996; 2,635,997: 2,635,998; 2,635,999 and 2,636,000 to Rohrbach all disclose that metal capsules of metals, such as zinc, magnesium, etc. can aid in providing protection against corrosion in oil and gas wells in the presence of naturally occurring brine. However, the Rohrbach patents are primarily directed to filling the metal capsule with a corrosion inhibiting composition which is released into the well fluid from the capsule.

None of the prior art known to Applicants teaches that particulate metal additives can be used to inhibit corrosion of ferrous metals by aqueous brines of the type used in well servicing operations.

SUMMARY OF THE INVENTION

It is therefore an object of the present invention to provide an improved method for reducing corrosion of ferrous metal components in well bore environments.

Another object of the present invention is to provide a well servicing fluid which exhibits reduced corrosiveness to ferrous metal components.

The above and other objects will become apparent from the description given herein and the appended claims.

In the method of the present invention, an aqueous brine containing a water-soluble zinc salt is admixed with a particulate metal additive, the metal being present in an amount sufficient to inhibit the corrosion of ferrous metals contacted by the brine, the metal forming the additive having a standard oxidation-reduction potential above 0.5 and below 2.5 volts.

The present invention also provides a well bore fluid which contains an aqueous brine containing a water-soluble zinc salt and a particulate metal additive, the metal of the additive having a standard oxidation-reduction potential above 0.5 and below 2.5 volts, the additive being present in an amount sufficient to inhibit corrosion of ferrous metals contacted by the well bore liquid.

DESCRIPTION OF THE PREFERRED EMBODIMENT

The aqueous brines which are used in the method and compositions of the present invention are those brines which contain at least one water-soluble zinc salt, preferably a halide salt, such as zinc chloride, zinc bromide, etc. Especially preferred are brines having a density greater than about 12.0 pounds per gallon (ppg), particularly from about 12.0 to about 19.2 ppg and formed by aqueous solutions of salts selected from the group consisting of calcium chloride, calcium bromide, zinc chloride, zinc bromide and mixtures thereof. It will be apparent that the aqueous brine can also contain other water-soluble salts, such as alkali metal salts and other alkaline earth metal salts.

The particulate metal additive useful as the corrosion inhibitor in the method and composition of the present invention can be comprised of any metal which has a standard oxidation-reduction potential above 0.5 and below 2.5 volts.

The term "metal additive" is intended to include an elemental metal, a mixture of two or more elemental metals, an alloy of two or more metals, a mixture of one or more elemental metals and one or more alloys, etc.

Thus, metals such as zinc magnesium, magnesium-aluminum alloys, cobalt, copper, lead, etc. can be employed. Especially preferred as the particulate metal additive is zinc powder or a mixture of zinc and magnesium powders.

The term "particulate," as used herein, refers to metal additives which are in the finely divided state, such as powders, having an average particle size of from about 10 to about 200 microns. It must be borne in mind that the particulate metal additive must be finely divided so as to not interfere with the action of pumps, valves and downhole tools used for well servicing operations.

The metal additive will generally be present in an amount of from about 500 to about 10000 parts per million by weight depending upon the particular brine employed, the downhole temperatures encountered, the particular metal additive used and other factors which affect the rate of corrosion of the ferrous metal components. In general, the amount of metal additive employed in the method and composition will be such as to effect the desired degree of corrosion inhibition, taking into consideration the variables discussed above.

To more fully illustrate the invention, the following non-limiting examples are presented: In the examples, two test procedures were employed to determine the effectiveness of the metal additives. In the dynamic corrosion wheel test procedure (dynamic test), rod coupons of 1020 steel (1/16" OD×7" long) were cleaned in inhibited 15% HCl, rinsed in water, isopropanol, and acetone and then dried. The cleaned rods were then weighed and placed in 8 ounce juice bottles containing brine with or without the inhibitor. The bottles were then placed on a wheel tester for 24 hours at the specified temperature and rotated at a speed of 30 rpms. Following the test, the coupons were cleaned in inhibited 15% HCl, rinsed in water, isopropanol and acetone, dried and weighed. Weight loss in grams was determined. To calculate corrosion rate, C.R., the following formula was used:

$$C.R.\ mpy = \frac{Wt.\ Loss \times 534000}{7.86 \times area\ in\ sq.\ in.\ \times hours\ exposed}$$

To calculate percent corrosion inhibition, C.I., the following formula was employed:

$$\%\ C.I. = \frac{C.R.\ uninhibited - C.R.\ inhibited}{C.R.\ Uninhibited} \times 100$$

In the static aging cell test procedure (static test), panels of 1018 steel ($\frac{1}{2}" \times 6"$ by 1/32") were cleaned in inhibited 15% HCl, rinsed in water, isopropanol and acetone. The panels were then dried, weighed and placed in an 8 ounce glass corrosion flask containing brines with or without the inhibitor. The glass cell was placed in a high pressure aging cell and sealed. The cell was pressurized to the desired pressure and placed in an oven for a required test period. When the test was completed, the panels were cleaned in inhibited 15% HCl, rinsed in water, isopropanol and acetone. The panels were then dried and weighed, and the weight loss determined in grams. The corrosion rate and percent corrosion inhibition were calculated by the formulas set out above.

In all of the examples which follow, the metal powders employed had an average particle size of approximately 44 microns or less.

Example 1

In this example, the brine employed was an 18.0 ppg $CaBr_2/ZnBr_2$. A dynamic test was conducted at 240° F. for 24 hours. The results are shown in Table 1 below.

TABLE 1

| Chemical | Inhibitor Conc. ppm | Corrosion Rate MPY | % Inhibition |
|---|---|---|---|
| Blank | 0 | 35.1 | — |
| Zinc Powder | 100 | 23.4 | 33.4 |
| Zinc Powder | 500 | +6.2* | 117.5 |

*Weight gain - Panel coated

Example 2

In this example, a 16 ppg $CaBr_2/ZnBr_2$/brine and an 18 ppg $CaBr_2/ZnBr_2$ brine were employed. A dynamic test was conducted at 240° F. for 23 hours. The results are shown in Table 2 below.

TABLE 2

| Blend | Chemical | Inhibitor conc. ppm | Corrosion Rate MPY | % Inhibition |
|---|---|---|---|---|
| 18.0 ppg | Control | 0 | 44.3 | — |
| 18.0 ppg | Zinc Powder | 200 | 5.78 | 87.0 |
| 18.0 ppg | Zinc Powder | 300 | +1.0* | 102 |
| 18.0 ppg | Zinc Powder | 400 | +4.4 | 110 |
| 18.0 ppg | Zinc Powder | 500 | +11.1* | 125 |
| 18.0 ppg | Zinc Powder | 1000 | +7.9 | 118 |
| 16.0 ppg | Control | 0 | 36.2 | — |
| 16.0 ppg | Zinc Powder | 200 | 40.7 | + |
| 16.0 ppg | Zinc Powder | 300 | 37.5 | + |
| 16.0 ppg | Zinc Powder | 400 | +2.9* | 107 |
| 16.0 ppg | Zinc Powder | 500 | +8.4* | 119 |
| 16.0 ppg | Zinc Powder | 1000 | +34.5* | 178 |

*Weight gain - Panel coated
+Accelerates Corrosion

As can be seen from the data in Table 2, the amount of the metal additive needed is dependent upon the type and composition of the brine. Note that whereas 200 ppm of zinc powder is effective as a corrosion inhibitor in the 18.0 ppg brine, 200 ppm of zinc powder actually accelerates the corrosion in a 16.0 ppg brine.

Example 3

The procedure of Example 1 was repeated with the exception that different metal additives, as well as a non-metallic additive, were employed. The results are shown in Table 3 below.

TABLE 3

| Chemical | Inhibitor Conc. ppm | Corrosion Rate MPY | % Inhibition |
|---|---|---|---|
| Control | 0 | 41.9 | — |
| Magnesium Powder | 100 | 0 | 100 |
| Magnesium Powder | 500 | 0 | 100 |
| Aluminum Powder | 100 | 14.4 | 65.7 |
| Aluminum Powder | 500 | +1.23* | 103 |
| Cobalt Powder | 100 | 17.2 | 58.8 |
| Cobalt Powder | 500 | 4.51 | 89.2 |
| Copper Powder | 100 | +13.8* | 133 |
| Copper Powder | 500 | +45.9* | 210 |
| Arsenic Powder | 100 | 25.4 | 39.2 |
| Arsenic Powder | 500 | 17.4 | 58.3 |
| Iodine | 500 | 42.9 | + |

*Weight gain - Panel Coated
+Accelerates Corrosion

Example 4

The procedure of Example 1 was followed with the exception that different metal additives were employed. The results are shown in Table 4 below.

TABLE 4

| Chemical | Inhibitor Conc. ppm | Corrosion Rate MPY | % Inhibition |
|---|---|---|---|
| Control | 0 | 48.8 | — |
| Control-Galvanized Steel Panel | 0 | 37.9 | |
| Cobalt Powder | 1000 | 4.67 | 90.4 |
| Cobalt Powder | 5000 | 5.33 | 89.1 |
| Arsenic Powder | 5000 | 5.44 | 88.9 |
| Arsenic Powder | 1000 | 13.8 | 71.7 |
| Aluminum Powder | 500 | 32.7 | 33.0 |
| Aluminum Powder | 100 | 38.6 | 20.1 |

As can be seen from the results in Table 4, in general, the metal powder additives are much more effective at controlling the corrosion rate than a galvanized steel panel which contains zinc but which is not in particulate form.

Example 5

The procedure of Example 4 was followed with the exception that different metal additives were employed. The results are shown in Table 5 below.

TABLE 5

| Chemical | Inhibitor Conc. ppm | Corrosion Rate MPY | % Inhibition |
|---|---|---|---|
| Control | 0 | 25.4 | — |
| Zinc Powder + Magnesium Powder | 250 Zn 250 Mg | +53.5* | 311 |
| Zinc Powder | 500 | +7.1* | 128 |
| Zinc Powder + Aluminum Powder | 250 Zn 250 Al | 3.7 | 85.4 |

*Weight gain - Panel Coated

As can be seen from the data in Table 5, the combination of zinc powder and magnesium powder is a highly effective corrosion inhibitor as evidenced by the fact that there is a significant weight gain on the test coupons.

Example 6

The procedure of Example 2 was followed with the exception that different metal additives were employed.

TABLE 6

| Blend | Chemical | Inhibitor conc. ppm | Corrosion Rate MPY | % Inhibition |
|---|---|---|---|---|
| 16.0 ppg | Control | 0 | 43.9 | — |
| 16.0 ppg | Zinc Powder | 1000 | +.62* | 101 |
| 16.0 ppg | Zinc L-101 (Powder) | 1000 | 1.03 | 97.7 |
| 16.0 ppg | Cobalt Powder | 1000 | 4.10 | 90.7 |
| 16.0 ppg | Zinc Powder + Magnesium Powder | 500 Zn +500 Mg | 17.4 | 60.3 |
| 16.0 ppg | Magnesium Powder | 1000 | 27.3 | 37.9 |
| 18.0 ppg | Control | 0 | 41.4 | — |
| 18.0 ppg | Zinc Powder + Magnesium Powder | 500 Zn 500 Mg | +1.64* | 104 |
| 18.0 ppg | Magnesium Powder | 1000 | +0.41* | 101 |
| 18.0 ppg | Zinc Powder | 1000 | 0 | 100 |
| 18.0 ppg | Zinc L-101 (Powder) | 1000 | 1.03 | 97.5 |
| 18.0 ppg | Cobalt Powder | 1000 | 2.26 | 94.5 |

*Weight gain
Zinc L-101 - Special Grade of Powder From LDL Inc.

Example 7

In this example, inhibited and uninhibited 19.2 ppg CaBr$_2$/ZnBr$_2$ brines were employed. A static test was conducted at a temperature of 350° F. for forty hours at a nitrogen pressure of 500 psi. The results are shown in Table 7 below.

TABLE 7

| Chemical | Inhibitor Conc. ppm | Corrosion Rate MPY | % Inhibition |
|---|---|---|---|
| Control | Inhibited*- As Received | 976 | — |
| Control | Unhibited | 775 | 20.6 |
| Zinc Powder | 500 | 2.3 | 99.7 |
| Zinc Powder | 250 | 759 | 22.3 |
| Thiourea | 5000 | 537 | 45.0 |

*Contains an organic amine corrosion inhibitor

As can be seen from the data in Table 7, the inhibited brine shows a higher corrosion rate than the uninhibited brine. This can be explained by the fact that, under the conditions of the test, the organic amine corrosion inhibitor breaks down forming products which actually accelerate the corrosion. However, it is significant that a level of 5,000 parts of thiourea, a common corrosion inhibitor, is not as effective at inhibiting corrosion as 500 ppm of zinc powder.

Example 8

In this example, an 18.0 ppg CaBr$_2$/ZnBr$_2$ brine was employed. A static test was conducted at 350° F. at twenty-four and seventy-two hours at a nitrogen pressure of 500 psi. The results are shown in Table 8 below.

TABLE 8

| Time | Chemical | Inhibitor Conc. ppm | Corrosion Rate MPY | % Inhibition |
|---|---|---|---|---|
| 24 hrs. | Control | 0 | 30.6 | — |
| 24 | Zinc Powder | 500 | +1.33* | 109 |
| 24 | Copper Powder | 500 | 25.8 | 15.7 |
| 24 | Magnesium Powder | 500 | 30.6 | + |
| 24 | Aluminum Powder | 500 | 38.2 | + |
| 72 | Control | 0 | 54.9 | — |
| 72 | Zinc Powder | 500 | 25.3 | 53.9 |
| 72 | Aluminum Powder | 500 | 40.6 | 26.0 |
| 72 | Magnesium Powder | 500 | 61.6 | + |
| 72 | Copper Powder | 500 | 71.6 | + |

*Weight gain
+Accelerates Corrosion

As can be seen, depending upon the type of brine, the conditions experienced by the brine, and other such factors, the amount of the metal additive has to be adjusted in order to achieve effective corrosion inhibition. Note, for example, that levels of 500 ppm, magnesium powder and aluminum powder actually accelerate corrosion.

Example 9

The procedure of Example 8 was followed with the exception that the time periods employed for the tests were at 70 hours and 23 hours. The results are shown in Table 9 below.

TABLE 9

| Time | Chemical | Inhibitor Conc. ppm | Corrosion Rate MPY | % Inhibition |
|---|---|---|---|---|
| 70 hrs. | Control | 0 | 35.7 | — |
| 70 | Zinc Powder | 2000 | 9.34 | 73.8 |
| 70 | Zinc Powder | 1000 | 25.7 | 28.0 |
| 70 | Galvanized Steel Panel | 0 | 123 | + |
| 23 | Control | 0 | 21.6 | — |
| 23 | Zinc Powder | 2000 | +1.11* | 105 |
| 23 | Zinc Powder | 1000 | 6.0 | 72.2 |
| 23 | Galvanized Steel Panel | 0 | 239 | + |

*Weight gain
+Accelerates Corrosion

This example clearly demonstrates that galvanized steel panels which contain zinc are completely ineffective as compared with zinc powder in inhibiting corrosion rates. Note that at both 23 and 70 hours, the galvanized steel panels actually accelerate the corrosion.

The foregoing disclosure and description of the invention is illustrative and explanatory thereof, and various changes in the method steps may be made within the scope of the appended claims without departing from the spirit of the invention.

What is claimed is:

1. A method of inhibiting corrosion of ferrous metals by aqueous brines containing a water-soluble zinc salt comprising admixing with said brine a particulate metal additive, the metal of said additive having a standard oxidation-reduction potential above 0.5 and below 2.5 volts, said metal additive being added in an amount sufficient to inhibit the corrosion of ferrous metals contacted by said brine.

2. The method of claim 1 wherein said particulate metal additive is selected from the class consisting of zinc, magnesium, aluminum, cobalt, copper, arsenic and mixtures thereof.

3. The method of claim 1 wherein said particulate metal additive is present in said brine in an amount of from about 50 parts per million by weight to about 2,000 parts per million by weight.

4. The method of claim 1 wherein said particulate metal additive comprises zinc powder.

5. The method of claim 1 wherein said particulate metal additive comprises a mixture of zinc powder and magnesium powder.

6. A well bore fluid comprising an aqueous brine containing a water-soluble zinc salt and a particulate metal additive, the metal of said additive having a standard oxidation-reduction potential above 0.5 and below 2.5 volts, said additive being present in an amount sufficient to inhibit the corrosion of ferrous metals contacted by said well bore liquid.

7. The well bore fluid of claim 6 wherein said particulate metal additive is selected from the class consisting of zinc, magnesium, aluminum, cobalt, copper, arsenic and mixtures thereof.

8. The well bore fluid of claim 6 wherein said aqueous brine comprises a solution of at least one water-soluble calcium salt.

9. The well bore fluid of claim 8 wherein said aqueous brine has a density greater than about 12.0 pounds per gallon.

10. The well bore fluid of claim 8 wherein said water-soluble salt is selected from the group consisting of calcium chloride, calcium bromide and mixtures thereof.

11. The well bore fluid of claim 6 wherein said particulate metal additive comprises powdered zinc.

12. The well bore fluid of claim 6 wherein said particulate metal additive comprises a mixture of zinc powder and magnesium powder.

* * * * *